US005479517A

United States Patent [19]

Linhard

[11] Patent Number: 5,479,517

[45] Date of Patent: Dec. 26, 1995

[54] METHOD OF ESTIMATING DELAY IN NOISE-AFFECTED VOICE CHANNELS

[75] Inventor: Klaus Linhard, Neu-Ulm, Germany

[73] Assignee: Daimler-Benz AG, Stuttgart, Germany

[21] Appl. No.: 171,472

[22] Filed: Dec. 23, 1993

[30] Foreign Application Priority Data

Dec. 23, 1992 [DE] Germany .......................... 42 43 831.4

[51] Int. Cl.[6] .................................................... H04B 15/00

[52] U.S. Cl. ................................................ 381/94; 381/97

[58] Field of Search ................................ 381/92, 94, 97, 381/46, 47, 66; 367/124, 125, 136, 901, 123

[56] References Cited

U.S. PATENT DOCUMENTS 4,017,859 4/1977 Medwin .................................. 367/901
4,982,375 1/1991 Ng .

FOREIGN PATENT DOCUMENTS 0332890 9/1989 European Pat. Off. .
0339891 11/1989 European Pat. Off. .
3531230 3/1987 Germany .
3929481 3/1990 Germany .

OTHER PUBLICATIONS

Stremler, Ferrel G., *Introduction to Communication Systems*, 1990, Addison–Wesley Pub. Co., p. 334.

Martin Schlang, "Ein Verfahren Zur Automatischen Ermittlung Der Sprecherposition Beifreisprechen", TU München und Siemens AG, Zentrale Aufgaben Informationstechnik, Germany, pp. 69–73 (1988).

*Primary Examiner*—Forester W. Isen
*Attorney, Agent, or Firm*—Spencer, Frank & Schneider

[57] ABSTRACT

The present invention relates to a method of reducing noise in a speech detection system. The phases of at least two noise-affected signals are estimated. The phase estimate and the phase compensation required for the noise reduction are performed in the frequency domain. The background noise and the transient behavior of the enclosed space are simultaneously estimated.

17 Claims, 2 Drawing Sheets

METHOD OF ESTIMATING DELAY IN NOISE-AFFECTED VOICE CHANNELS

BACKGROUND OF THE INVENTION

1. Field of the Invention

The present invention relates to a method for estimating phase, or delay, between signals of at least two noise-affected voice channels. More particularly, the present invention relates to method for estimating phase, or delay, between signals of at least two noise-affected voice channels based on maxima of a cross power density signal of the two voice channels.

2. Description of the Related Art

Such a method is used in automatic speech (voice) detection or recognition systems or for voice-actuated systems, for example, systems used in offices, motor vehicles, etc., for responding to a voice command.

Noise-affected speech can be better detected if the speech is recorded in two or more channels. For example, the human hearing system employs two channels, that is, two ears. Direction of a speaker is determined by psychoacoustic post-processing and background noise is cut out. In technical devices, two or more channels can be employed for recording a voice. These related recorded signals are then processed in a digital signal processing system.

A significant aspect of multi-channel processing is estimation of delay differences between the individual channels. If the difference in delay is known, the direction of the sound event (speaker) can be determined. The delay in the signals from the individual channels can be corrected accordingly and processed further. If, for example, uncorrected signals are combined into a sum signal, individual spectral components of the signal may be amplified, attenuated or erased by interference.

One method for automatically determining differences in delay between two microphones is disclosed in a publication by M. Schlang in ITG-Fachtagung 1988, Bad Nauheim, pages 69–73. The disclosed method operates in the time domain. However, the Schlang method cannot be employed with heavy noise.

SUMMARY OF THE INVENTION

It is therefore an object of the present invention to provide a method, operating in a time, for estimating the delay in a speech/voice detection system in a multi-channel transmission system, with the method being suitable also for use in the presence of strong background noise, and providing cost savings.

This is accomplished by providing a speech/voice detection or recognition system which determines the phase values of at least two signals in the frequency domain over a predetermined number of maxima of a cross power density signal indicating their associated phase shift, and effects a required phase compensation in the frequency domain. Advantageous features and/or modifications are defined in the dependent claims.

The present invention provides a method for estimating a delay between a first signal of a first noise-affected voice channel and a second signal of a second noise-affected voice channel, wherein the first and second signals are related, the method comprising the steps of transforming the first and second signals to frequency domain signals, cross correlating the transformed first and second signals to produce a cross power density of the first and second signals, generating a phase value representing a phase between the first and second signals based on a first predetermined number of maxima values of the cross power density of the first and second signals, and performing a phase compensation in the frequency domain based on the phase value for compensating for the delay between the first and second signals.

According to one aspect, the method according to the present invention further includes the steps of producing a background noise value based on a background noise associated with the noise-affected voice channels, and producing a transient behavior value based on a transient behavior of an enclosed space associated with the noise-affected voice channels, and wherein the step of generating the phase value being further based on the background noise signal and the transient behavior signal. Preferably, the background noise value is based on an estimated noise signal generated by a noise monitor, and the step of generating the phase value is performed if the background noise value exceeds a first predetermined factor. Additionally, the transient behavior value of the enclosed space is preferably based on an impulse signal generated by an impulse monitor, and the step of generating a phase value is performed if an increase in energy in the first and second noise-affected channels exceeds a first predetermined amount. According to another aspect of the present invention, the delay between the first and second signals is estimated to be linear.

Preferably, the step of generating the phase value includes the step of smoothing the phase value from a beginning of a spoken word to a predetermined time after the beginning of the spoken word based on a variance of a phase estimate value.

According to yet another aspect of the present invention, the step of transforming the first and second signals into frequency domain signals is based on a fast Fourier transform. Further, the step of cross correlating the transformed first and second signals includes the steps of spectrally subtracting from the transformed first signal its long-term average to produce a first estimated value, spectrally subtracting from the transformed second signal its long-term average to produce a second estimated value, and cross correlating the first and second estimated values to produce the cross power density of the first and second signals.

Additionally, the step of generating a phase value preferably includes the steps of producing a second number of maxima values of the cross power density of the first and second signals, updating an estimated phase value based on the second number of maxima values, calculating a phase rise value based on the estimated phase value, smoothing the phase rise value based on an impulse signal representing a simulated speech signal, producing an estimated noise value, based on a background noise signal generated by a noise monitor, and generating the phase value if the updated estimated phase value is greater than the estimated noise value or if an increase in energy in the first and second signals exceeds a first predetermined amount. The first predetermined number of maxima values is equal to or greater than the second number of maxima values.

According to the present invention, if the phase rise value does not exceed a predetermined maximum rise value for the second number of maxima values the step of generating the phase value is performed. In another aspect of the invention, the step of smoothing the phase rise value is based on a variance of a plurality of phase rise values. Preferably, the step of generating the phase value is performed if the phase rise value satisfies a valid phase rise condition for a predetermined number of successive times.

Using the method of the invention, the delay between respective signals of at least three noise-affected voice channels can be estimated, where the signals of the at least three noise-affected voice channels are related.

BRIEF DESCRIPTION OF THE DRAWINGS

The invention will now be described in greater detail with reference to an embodiment thereof and to schematic drawings.

DETAILED DESCRIPTION OF THE PREFERRED EMBODIMENTS

The present invention provides a two-channel delay compensation technique. Expansion to more channels is easily performed with a correspondingly increase in expenditures. The delay compensation according to the present invention is part of a signal pre-processing technique for a multi-channel noise reduction which may be employed, for example, in a speech detector system in a motor vehicle.

The delay is determined in the frequency domain which permits simple delay correction by multiplication of the signal spectrum with a new phase, leading to low computation costs.

The speech and noise recordings for developing and evaluating the method of the present invention were made in a vehicle equipped with two microphones. The noise interference is the travel noise experienced during various travel situations.

With the method according to the invention, the phases between the two voice channels are determined in the frequency domain from a number of maxima of the cross-correlation of signals of the two channels. The background noise and the transient behavior of the enclosed space are simultaneously estimated as well. The individual phase values are processed only at the beginning of a transient period and whenever the background noise is exceeded by a certain factor. During the further processing of the phase values, a linear phase relationship is assumed to exist and the variance in the estimate is also considered when the values are smoothed. Consideration of the transient behavior of the enclosed space results in a phase estimate being made only if there is a great increase in the energy of the speech. A new phase estimation value is available immediately at the beginning of each word. The influence of reflections is reduced. By considering the background noise, the method is well suited for practical use, for example, in a vehicle. The steps of the phase estimation method will now be described in greater detail with reference to the block circuit diagram of FIG. 1.

Figure 1:
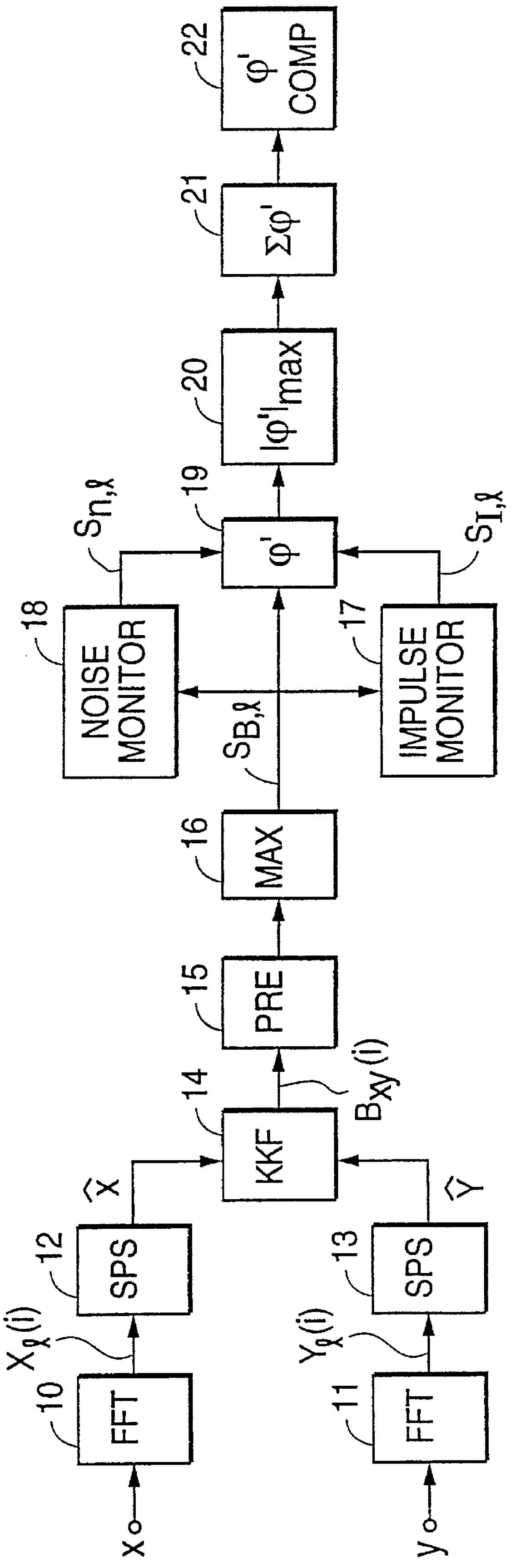
FIG. 1 is a block circuit diagram illustrating phase estimation between two noise-affected voice channels according to the present invention.

The microphone signals x and y are transformed into frequency domain signals using, for example, a fast Fourier transformation (FFT) at 10 and 11 in FIG. 1, respectively. The transformation length is selected to be, for example, N=256. This results in transformed segments $X_l(i)$ and $Y_l(i)$. In this case, the letter l identifies the block index of the segments, and the letter i identifies the discrete frequency (i=0, 1, 2, . . . , N−1). The segments are half overlapped and are weighted with a Hanning window. In the present example, the sampling rate for signals x and y is 12 KHz.

In the frequency domain, the long-term average of the magnitude spectrum for each channel is subtracted using spectral subtraction (SPS) at 12 and 13 in FIG. 1. The phase of the respective signals is not changed, but the interfering noise is reduced. This results in estimated values $\hat{X}$ and $\hat{Y}$. The SPS is a standard method and can be used in the present invention in a simplified version. If only a low level of noise exists in the enclosed space, no SPS is required and this step can be omitted.

The noise spectrum $S_{nn}(i)$ is estimated with the smoothing constant β. The noise spectrum is normalized and subtracted. The letter l identifies the block index, while i identifies the discrete frequency. The smoothing constant employed is, for example, $\beta_l$=0.03.

$$\hat{S}_{nn,l}(i) = (1-\beta_l)\hat{S}_{nn,l-1}(i) + \beta_l|X_l(i)|^2 \quad (1)$$

$$|X_l(i)| = |X_l(i)| - \frac{S_{nn,l}(i)}{|X_l(i)|} \quad (2)$$

Corresponding equations apply for the second channel Y.

$$X_l(i) = \left[\ 1 - \frac{S_{nn,l}(i)}{|X_l(i)|^2}\ \right] X_l(i) \quad (3)$$

From the estimated values $\hat{X}$ and $\hat{Y}$, the magnitude of the cross power density $B_{XY,l}$ is calculated at 14 in FIG. 1. The range ($N_u$, $N_o$) lies, for example, between 300 and 1500 Hz ($N_u$=6, $N_o$=31, with N=256). The following then applies:

$$S_{xy,l}(i)=(1-\alpha)S_{xy,l-1}(i)+\alpha\hat{X}_l(i)\hat{Y}_l^*(i);\ N_u \leqq i \leqq N_o \quad (4)$$

$$B_{xy,l}(i)=|S_{xy,l}(i)| \quad (5)$$

Smoothing constant α is selected, for example, to be α≈1. Values of α<<1 are not appropriate.

Higher frequencies may be emphasized by way of pre-emphasis at 15 in FIG. 1. This provides advantages if the speech signal and the noise signal have less power at higher frequencies than at lower frequencies. The values of the cross power $B_{xy}(i)$ may be raised linearly, for example, by 10 dB in a range from 300 to 1500 Hz. However, the pre-emphasis may also correspond to the microphone characteristic.

From the values $B_{xy}(i)$, M maxima are determined and summed at 16 in FIG. 1. For example, M=8 maxima may be employed. An actual estimated value is then determined as follows:

$$S_{B,l} = \frac{1}{M} \sum^{M} B_{xy,l}(i) \quad (6)$$

By way of an impulse monitor, a "simulated impulse response" $S_I$ is calculated at 17 in FIG. 1. The transient behavior of the surrounding space at the occasion of sudden high energy sound events (speech) is thus roughly simulated (e.g., γ=0.1 is selected). The smoothing of the phase value "from the beginning of the word into the word" can be adjusted by way of γ.

$$S_{I,l}=(1-\gamma)\ S_{I,l-1}+\gamma S_{B,l} \quad (7)$$

In addition, an adaptive smoothing constant h is calculated by way of a noise monitor at 18 in FIG. 1. With this smoothing constant, an estimated value $S_N$ results for the noise. If in the past a spectral subtraction (SPS) was performed, $S_N$ is now an estimated value for the residual noise. The following applies, for example, for smoothing constant $h_o$=0.03.

$$h_l = h_o \frac{2S_{N,l-1}}{S_{N,l-1} + S_{B,l}} \quad (8)$$

$$S_{N,l} = (1 - h_l)\, S_{N,l-1} + h_l S_{B,l} \quad (9)$$

The phase of the noise-affected signals is calculated from the real and imaginary components of $S_{xy}$. The phase is calculated only at the M previously determined maxima at 19 in FIG. 1, as follows, $$\phi_l(i) = \arctan \frac{Im[S_{xy,l}(i)]}{Re[S_{xy,l}(i)]} \text{ for } Re > 0 \quad (10)$$

and otherwise $$\phi_l(i) = \pi - \arctan \frac{-Im[S_{xy,l}(i)]}{Re[S_{xy,l}(i)]} \quad (11)$$

This results in the phase rise as follows:

$$\phi'_l(i) = \frac{\phi_l(i)}{i} \quad (12)$$

With the length of the Fourier transform N and the maximum permissible shift by n taps, the following results (N=256) at 20 in FIG. 1:

$$|\phi'|_{max} = |n| \frac{2\pi}{N} \quad (13)$$

If the phase rise exceeds $|\phi'|$ at one of the maxima $|\phi'|_{max}$, this value of $\phi'$ is used no longer. An adaptive smoothing constant g is then calculated as follows:

$$g_l = \frac{g_o(S_{b,l} - S_{I,l})}{S_{I,l}} \quad (14)$$

$$g_l \leqq g_{max} \quad (15)$$

$$g_{max} = 0.25;\ g_o = 0.25 \quad (16)$$

The updated value $S_B$ must be greater than the simulated pulse response $S_I$ by a factor of c:

$$S_{B,l} \geqq c S_{I,l};\ c=2 \quad (17)$$

otherwise the following applies:

$$g_l = 0 \quad (18)$$

The updated value $S_B$ must be greater than the residual noise $S_N$ by a factor of d:

$$S_{B,l} \geqq d S_{N,l};\ d=3 \quad (19)$$

otherwise the following again applies:

$$g_l = 0 \quad (20)$$

If the conditions of Equation (17) or Equation (19) are not met, that is, if g=0, the phase estimate can be terminated, and the old estimated phase value applies.

For all $$|\phi'_l(i)| \leqq |\phi'|_{max} \quad (21)$$

the following applies:

$$m_{\phi' l} = \frac{1}{M'} \sum^{M'} \phi'_l(i) \quad (22)$$

$$s^2_{\phi',l} = \frac{1}{M'} \sum^{M'} (\phi'_l(i))^2 \quad (23)$$

Because of the conditions of Equation (21), only M' of the original M maxima are employed for Equations (22) and (23) at 21 in FIG. 1. If the number M' of the values $\phi$ applicable for the sums is less than $M_{min}$, the estimated phase between the channels is considered to be too uncertain or to lie outside of the useful range (e.g. $M_{min}$=6, with M=8). The phase estimate is then not updated and the process is interrupted here. The old estimated phase value applies.

The variance of the estimate is calculated as follows:

$$\sigma^2_{\phi',l} = s^2_{\phi',l} - m^2_{\phi',l} \quad (24)$$

The following is employed as the maximum variance:

$$\sigma^2_{max} = |\phi'|^2_{max} \quad (25)$$

The smoothing constant g is weighted to correspond to the variance. If there is a wide spread, the following applies:

$$g_l := 0.09 * g_l;\ \text{for } 0.2\, \sigma^2_{max} < \sigma^2_{\phi',l} < \sigma^2_{max} \quad (26)$$

For an average spread, the following applies:

$$g_l := 0.3 * g_l;\ \text{for } 0.02\, \sigma^2_{max} \leqq \sigma^2_{\phi',l} \leqq 0.2\, \sigma^2_{max} \quad (27)$$

If there is very little spread, the following applies:

$$g_l := g_l;\ \text{for } \sigma^2_{\phi',l} < 0.02\, \sigma^2_{max} \quad (28)$$

According to Equations (19) to (22), g will generally be greater than zero only at the beginning of the word. The energy of the word at this time must be greater than the energy of the residual noise and of the simulated impulse response. The variable j is used to count the successive numbers for g>0. Accordingly, the following applies for the smoothing process:

$j = 1$:

$$\phi'_l = m_{\phi',l} \quad (29)$$

$j = 2$:

$$m_{\phi' l} = \frac{(m_{\phi' l} + m_{\phi' l-1})}{2} \quad (30)$$

$$\phi'_l = (1 - 1.5\, g_l)\phi'_{l-1} + 1.5\, g_l m_{\phi',l} \quad (31)$$

$j = 3, 4, \ldots$:

$$\phi'_l = (1 - g_l)\, \phi'_{l-1} + g_l m_{\phi',l} \quad (32)$$

If, for example, due to an interference, the condition g>0 is met only once in succession, the phase estimate is not updated. Updating of the phase estimate takes place only if g>0 occurs at least twice in succession.

Compensation of the phase, or delay, between the two microphone signals is effected at 22 in FIG. 1 for signal processing of the voice signal, for example, by simple multiplication of a voice spectrum signal by a new phase which is based on the estimated phase between the two noise-affected voice channels.

Figure 2:
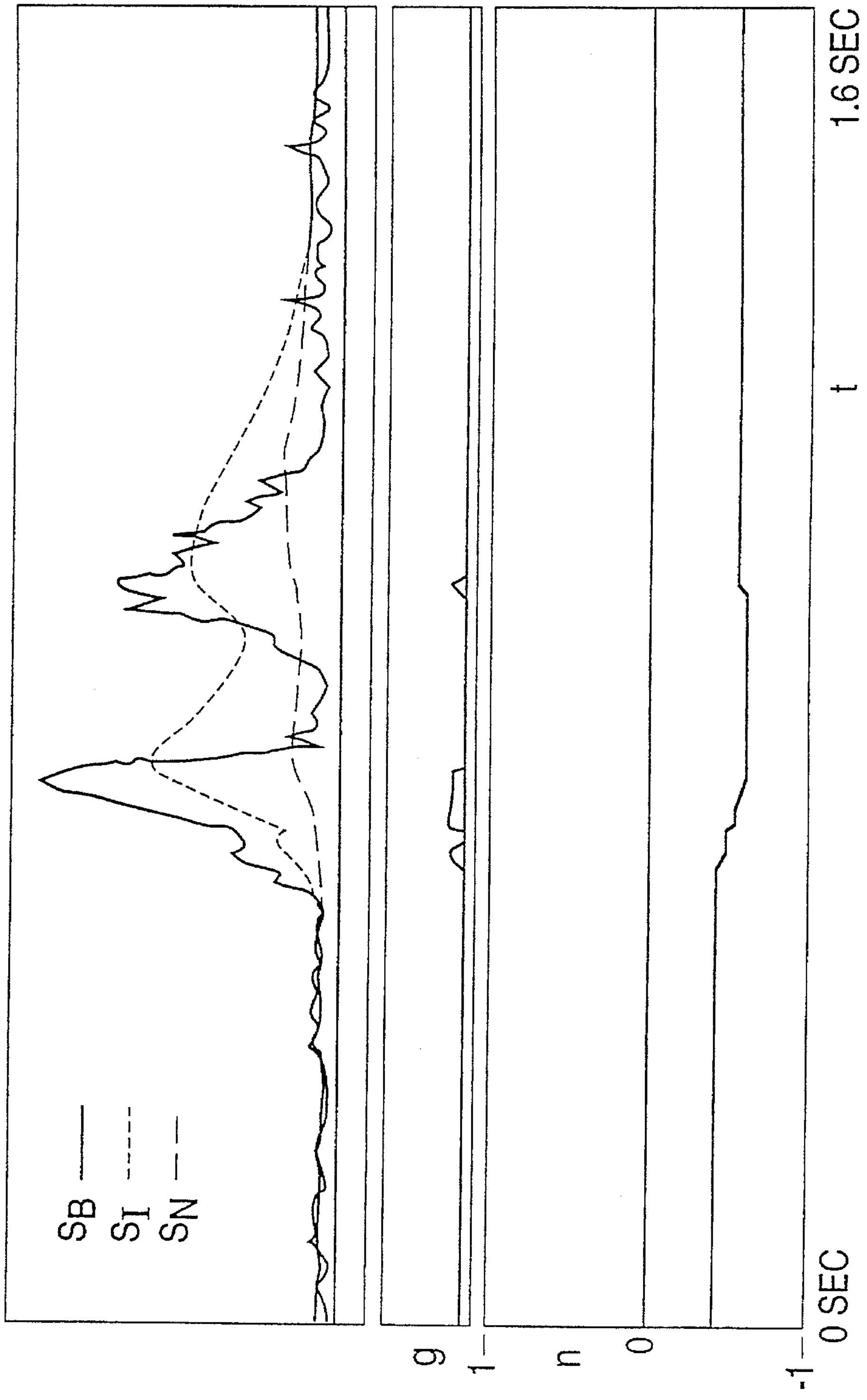
FIG. 2 is a representation of the values $S_B$, $S_I$, $S_N$ and g as a function of time for travel noises encountered at 140 km/h.

An example for intermediate values $S_B$, $S_I$, $S_N$, and g and a phase estimate derived therefrom is shown in FIG. 2. The words "Select Station" are spoken and travel noise is added corresponding to a 140 km/h vehicle speed. The method of the present invention is employed as described above. The phase estimate is given in sample values n. The value $S_I$ partially covers the "speech impulse" and thus an estimate is made only if there is a great increase in energy, that is, $S_B$ must exceed $S_I$ by a factor of 2. The estimate of the residual noise $S_N$ permits a greater robustness of the estimated phase with respect to noise ($S_B$ must exceed $S_N$ by a factor of 3).

It will be understood that the above description of the present invention is susceptible to various modification, changes and adaptations, and the same are intended and comprehended within the meaning and range of equivalents of the appended claims.

What is claimed is:

1. A method for estimating a delay between a first signal of a first noise-affected voice channel and a second signal of a second noise-affected voice channel, the first and second signals being related, the method comprising the steps of:

transforming the first and second signals to frequency domain signals;

cross correlating the transformed first and second signals to produce a cross power density of the first and second signals;

generating a phase value representing a phase between the first and second signals based on a first predetermined number of maxima values of the cross power density of the first and second signals; and performing a phase compensation in the frequency domain based on the phase value for compensating for the delay between the first and second signals.

2. A method according to claim 1, further comprising the steps of:

producing a background noise value based on a background noise associated with the noise-affected voice channels; and producing a transient behavior value based on a transient behavior of an enclosed space associated with the noise-affected voice channels; and wherein the step of generating the phase value is further based on the background noise signal and the transient behavior signal.

3. A method according to claim 2, wherein the background noise value is based on an estimated noise signal generated by a noise monitor, and wherein the step of generating the phase value is performed if the background noise value exceeds a first predetermined factor.

4. A method according to claim 2, wherein the transient behavior value of the enclosed space is based on an impulse signal generated by an impulse monitor, and wherein the step of generating a phase value is performed if an increase in energy in the first and second noise-affected channels exceeds a first predetermined amount.

5. A method according to claim 1, wherein the delay between the first and second signals is estimated to be linear.

6. A method according to claim 1, wherein the step of generating the phase value includes the step of smoothing the phase value from a beginning of a spoken word to a predetermined time after the beginning of the spoken word based on a variance of a phase estimate value.

7. A method according to claim 1, wherein the step of cross correlating the transformed first and second signals includes the steps of:

spectrally subtracting from the transformed first signal a long-term average of the transformed first signal to produce a first estimated value;

spectrally subtracting from the transformed second signal a long-term average of the transformed second signal to produce a second estimated value; and cross correlating the first and second estimated values to produce the cross power density of the first and second signals.

8. A method according to claim 7, wherein the step of generating a phase value includes the steps of:

producing a second number of maxima values of the cross power density of the first and second signals;

updating an estimated phase value based on the second number of maxima values;

calculating a phase rise value based on the estimated phase value;

smoothing the phase rise value based on an impulse signal representing a simulated speech signal;

producing an estimated noise value, based on a background noise signal generated by a noise monitor; and generating the phase value if the updated estimated phase value is greater than the estimated noise value or if an increase in energy in the first and second signals exceeds a first predetermined amount.

9. A method according to claim 8, wherein the step of transforming the first and second signals into frequency domain signals is based on a fast Fourier transform.

10. A method according to claim 8, wherein the first predetermined number of maxima values is equal to or greater than the second number of maxima values.

11. A method according to claim 8, wherein the step of generating the phase value is performed if the phase rise value does not exceed a predetermined maximum rise value for the second number of maxima values.

12. A method according to claim 8, wherein the step of smoothing the phase rise value is based on a variance of a plurality of phase rise values.

13. A method according to claim 8, wherein the step of generating the phase value is performed if the phase rise value satisfies a valid phase rise condition for a predetermined number of successive times.

14. A method according to claim 1, wherein the step of generating a phase value includes the steps of:

producing a second number of maxima values of the cross power density of the first and second signals;

updating an estimated phase value based on the second number of maxima values;

calculating a phase rise value based on the estimated phase value;

smoothing the phase rise value based on an impulse signal representing a simulated speech signal;

producing an estimated noise value, based on a background noise signal generated by a noise monitor; and generating the phase value if the updated estimated phase value is greater than the estimated noise value or if an increase in energy in the first and second signals exceeds a first predetermined amount.

15. A method according to claim 14, wherein the first predetermined number of maxima values is equal to or greater than the second number of maxima values.

16. A method according to claim 14, wherein the step of transforming the first and second signals into frequency domain signals is based on a fast Fourier transform.

17. A method according to claim 1, wherein the delay between respective signals of at least three noise-affected voice channels is estimated, the signals of the at least three noise-affected voice channels being related.

* * * * *